United States Patent
Beji et al.

(10) Patent No.: US 10,889,478 B2
(45) Date of Patent: Jan. 12, 2021

(54) CONTROL CONSOLE AND AERIAL LIFT INCLUDING SUCH A CONTROL CONSOLE

(71) Applicant: HAULOTTE GROUP, L'Horme (FR)

(72) Inventors: Slaheddine Beji, Vienne (FR); Ludovic Lemarchand, Oullins (FR)

(73) Assignee: HAULOTTE GROUP, L'Horme (FR)

( * ) Notice: Subject to any disclaimer, the term of this patent is extended or adjusted under 35 U.S.C. 154(b) by 2 days.

(21) Appl. No.: 16/060,371

(22) PCT Filed: Dec. 8, 2016

(86) PCT No.: PCT/EP2016/080180
§ 371 (c)(1),
(2) Date: Jun. 7, 2018

(87) PCT Pub. No.: WO2017/097874
PCT Pub. Date: Jun. 15, 2017

(65) Prior Publication Data
US 2018/0362312 A1    Dec. 20, 2018

(30) Foreign Application Priority Data

Dec. 9, 2015    (FR) ...................................... 15 62064

(51) Int. Cl.
*B66F 9/20*    (2006.01)
*G05B 19/409*    (2006.01)
(Continued)

(52) U.S. Cl.
CPC .............. *B66F 9/20* (2013.01); *B66F 11/046* (2013.01); *G05B 19/409* (2013.01); *B66F 17/006* (2013.01)

(58) Field of Classification Search
CPC ........ B66F 9/20; B66F 11/046; B66F 17/006; G05B 19/409
See application file for complete search history.

(56) References Cited

U.S. PATENT DOCUMENTS 4,044,856 A * 8/1977 Stevenson ............. B66F 11/044
182/2.4
4,456,093 A * 6/1984 Finley .................. B66F 17/006
182/18
(Continued)

FOREIGN PATENT DOCUMENTS

CA    3006379 A1 *    6/2017 ................ B66F 9/20
CN    201343420 Y    11/2009
(Continued)

OTHER PUBLICATIONS

International Search Report, dated Feb. 22, 2017, from corresponding PCT application No. PCT/EP2016/080180.

*Primary Examiner* — Daniel P Cahn
*Assistant Examiner* — Candace L Bradford
(74) *Attorney, Agent, or Firm* — Nixon & Vanderhye

(57) ABSTRACT

Disclosed is a control console for an aerial lift including a chassis, a platform, and a lift structure connecting the chassis to the platform, which control console includes manual control members for controlling the aerial lift. The control console includes, for at least one of the manual control members, at least one lighted indicator provided on or in the immediate environment of the manual control member and suitable for emitting light signals indicating the possibility of actuating the manual control member on the basis of conditions for operating the aerial lift.

14 Claims, 9 Drawing Sheets

(51) Int. Cl.
  *B66F 11/04* (2006.01)
  *B66F 17/00* (2006.01)

(56) References Cited

U.S. PATENT DOCUMENTS

| | | | | |
|---|---|---|---|---|
| 5,021,917 | A * | 6/1991 | Pike | B66F 11/046 |
| | | | | 182/2.11 |
| 5,201,629 | A * | 4/1993 | Simpson | B66F 9/07545 |
| | | | | 180/306 |
| 5,890,562 | A * | 4/1999 | Bartels | B60N 2/797 |
| | | | | 187/224 |
| 6,496,766 | B1 | 12/2002 | Bernold et al. | |
| 6,595,330 | B1 * | 7/2003 | Henrickson | B66F 9/0655 |
| | | | | 187/223 |
| 7,306,280 | B1 * | 12/2007 | Kraimer | B66F 9/07504 |
| | | | | 280/756 |
| 9,120,645 | B2 * | 9/2015 | Penn | B66B 1/3461 |
| 9,656,845 | B2 | 5/2017 | Dittus et al. | |
| 10,124,999 | B2 * | 11/2018 | Puszkiewicz | B66F 11/044 |
| 2009/0260920 | A1 * | 10/2009 | Cummings | B66F 11/046 |
| | | | | 182/18 |
| 2013/0240297 | A1 * | 9/2013 | Aquino | B66C 13/54 |
| | | | | 182/113 |
| 2015/0027808 | A1 * | 1/2015 | Baillargeon | A62B 35/0025 |
| | | | | 182/3 |
| 2015/0144426 | A1 * | 5/2015 | Hao | B66F 11/04 |
| | | | | 182/113 |
| 2015/0217981 | A1 * | 8/2015 | Baillargeon | B66F 17/006 |
| | | | | 182/2.8 |
| 2016/0075543 | A1 * | 3/2016 | Lombardo | B66F 11/044 |
| | | | | 187/247 |
| 2016/0137471 | A1 * | 5/2016 | Dittus | B66F 11/044 |
| | | | | 182/18 |
| 2018/0362313 | A1 * | 12/2018 | Bonnefoy | B66F 11/044 |
| 2019/0119090 | A1 * | 4/2019 | Maisonnette | B66F 11/044 |

FOREIGN PATENT DOCUMENTS

| | | |
|---|---|---|
| CN | 103097279 A | 5/2013 |
| CN | 202953782 U | 5/2013 |
| CN | 103787240 A | 5/2014 |
| CN | 204529247 U | 8/2015 |
| FR | 3 007 401 A1 | 12/2014 |
| JP | 2006-151575 A | 6/2006 |
| WO | 2014/206982 A1 | 12/2014 |

* cited by examiner

CONTROL CONSOLE AND AERIAL LIFT INCLUDING SUCH A CONTROL CONSOLE

BACKGROUND OF THE INVENTION

The present invention relates to a control console for an aerial lift, as well as an aerial lift comprising such a control console.

DESCRIPTION OF THE RELATED ART

Aerial lifts, or more generally aerial platforms for moving people, irrespective of whether they are self-propelled, comprise a lift structure and a platform, on which one or several individuals are installed to perform various work. The platform generally comprises a control console grouping together a certain number of manual control members making it possible to control the aerial lift. One or several electronic control units of the aerial lift limit the movement possibility based on a certain number of criteria, including the stability, mechanical movement limitations and normative requirements. It is therefore possible for an action by an operator on a manual control member not to be followed by effects due to a limitation imposed by the command control. This is a source of confusion for the operator, who does not know which movements are allowed and which are not, or which actions can be performed to reach his destination. This problem is particularly amplified on complex machines, in particular very high articulated lifts that deploy according to a predefined sequence. Furthermore, the operator does not necessarily have in-depth knowledge of the working of the vehicle, since he may be from a different trade and have received only very basic training on the workings of an aerial lift.

The control console of an aerial lift is equipped with alert indicators generally grouped together in a same zone. Known in particular is an overload indicator indicating that the mass onboard the platform exceeds the maximum authorized capacity, an tilt indicator indicating that the incline of the chassis exceeds the maximum authorized value, and a movement limitation indicator indicating that the lift structure of the machine has reached a position beyond which it can no longer move. None of these indicators informs the user of the manual control members that he can actuate to remove the machine from this alert state.

It is known to equip the control console with a screen schematically showing the manual control members of the control console, with color signals displaying whether a control member can be actuated. However, the reading of the screen may be difficult in full sunlight, and a screen is exposed to potential deteriorations caused by sprayed paint, sanding, or blows in the context of work done on the platform. A reinforced screen technology is therefore necessary, which involves a substantial cost. Furthermore, the cognitive link between the manual control members that the operators manipulate and their schematic depiction on a screen is not necessarily obvious.

BRIEF SUMMARY OF THE INVENTION

The invention intends to resolve these drawbacks by proposing a new control console for an aerial lift, in which the different actions that can be performed by an operator based on the usage conditions of the aerial lift are clearly available for the operator.

To that end, the invention relates to a control console for an aerial lift including a chassis, a platform, and a lift structure connecting the chassis to the platform, the control console comprising manual control members for controlling the aerial lift. This control console is characterized in that it comprises, for at least one of the manual control members, at least one lighted indicator provided on or in the immediate environment of this manual control member and suitable for emitting lighted signals indicating the possibility of actuating this manual control member as a function of the operating conditions of the aerial lift.

Owing to the invention, an operator may directly determine which manual control member can be actuated, and determine how to move the aerial lift or part of this aerial lift based on his needs, but without requiring in-depth knowledge of its workings.

According to advantageous but optional aspects of the invention, such a control console may incorporate one or more of the following features, considered in any technically allowable combination:

- Each manual control member can be actuated in at least two directions, and the control console comprises lighted indicators corresponding to one of the manual control members and suitable for indicating the possibility of actuating this manual control member in each of the possible actuating directions, based on the possibility of performing movements of the aerial lift commanded by the actuation of this manual control member in these directions.
- Each lighted indicator is positioned relative to the corresponding manual control member in a direction corresponding to an actuating direction of this manual control member.
- The lighted indicator(s) corresponding to a manual control member are placed at a distance from this manual control member smaller than the distance separating the lighted indicator(s) of another manual control member.
- At least one of the lighted indicators is fastened directly on a main panel of the control console.
- At least one of the lighted indicators is provided on a base fastened on a main panel of the control console.
- At least one of the lighted indicators is fastened on the manual control member corresponding to this lighted indicator.
- The base is formed by a rigid printed circuit covered by a sealed membrane, and at least one of the lighted indicators is integrated into the rigid printed circuit.
- The lighted indicators are topped by a diffuser suitable for widening the light emission surface of the lighted indicators.
- The diffusers are suitable for forming a lighted surface with a predefined shape.
- The lighted indicators are suitable for emitting one or several light signals from among:
  - a steady red light signal if it is impossible to perform a movement;
  - a red light signal emitted only if a manual control member is actuated while the corresponding movement is impossible;
  - a blinking green light during the actuation of a manual control corresponding to a performable movement.
- At least one lighted indicator is suitable for displaying a lighted signal attesting that an actuator of the aerial lift, used to perform the movement commanded by this manual control member, is or is not at the end of travel.
- The operating conditions of the aerial lift comprise at least one parameter from among a list including at least:
  - the position of the platform relative to an authorized movement envelope;

the mass carried on the platform;

the incline angle of the chassis;

the rolling of the chassis on the ground or the movement of the lift structure.

The invention also relates to an aerial lift comprising a control console as described above.

BRIEF DESCRIPTION OF THE DRAWINGS

The invention will be better understood, and other advantages thereof will appear more clearly, in light of the following description of a control console and an aerial lift according to its principle, provided as a non-limiting example in reference to the appended drawings, in which.

DETAILED DESCRIPTION OF THE PREFERRED EMBODIMENTS

Figure 1:
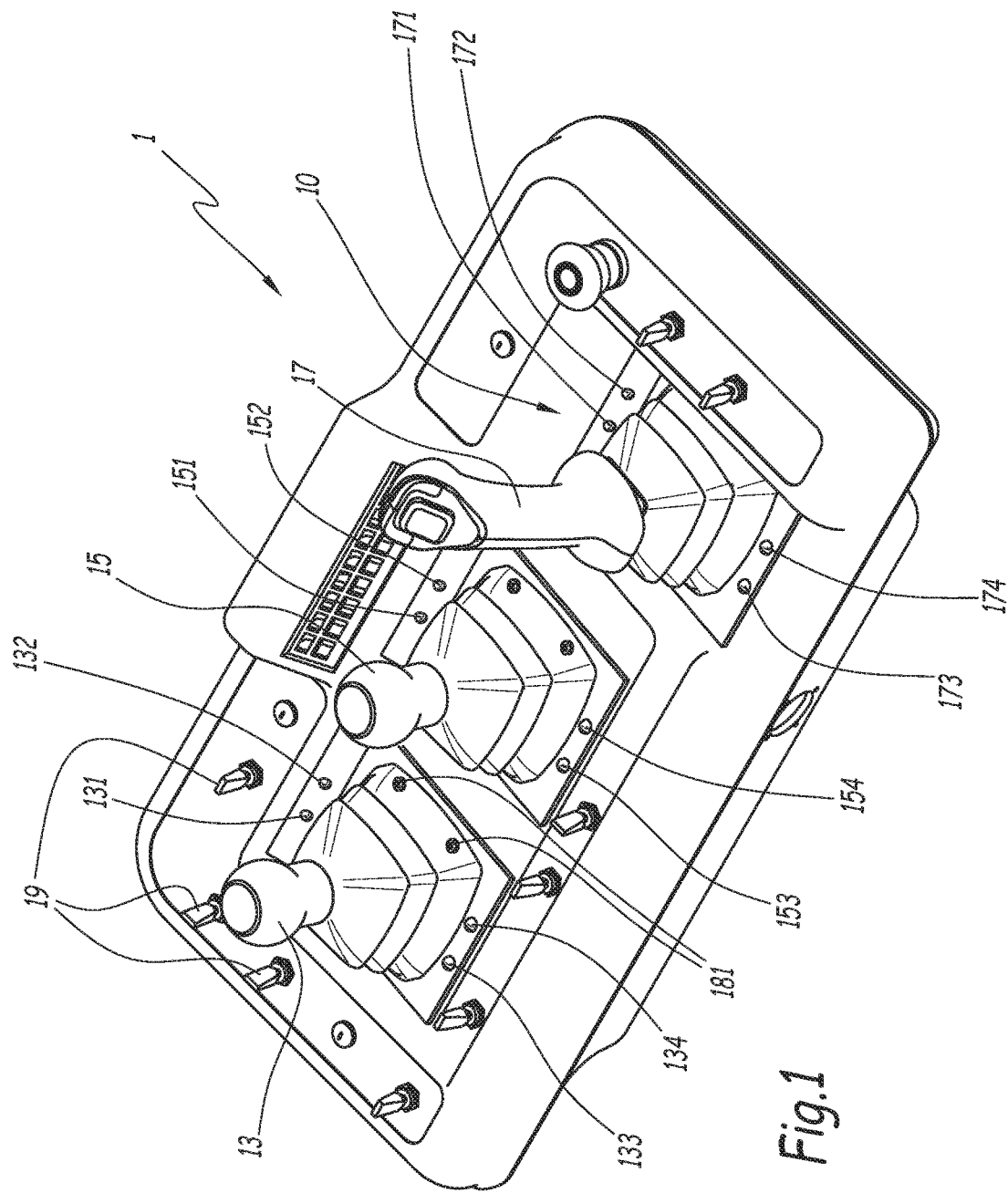
FIG. 1 is a perspective view of a control console according to the invention.
Figure 5:
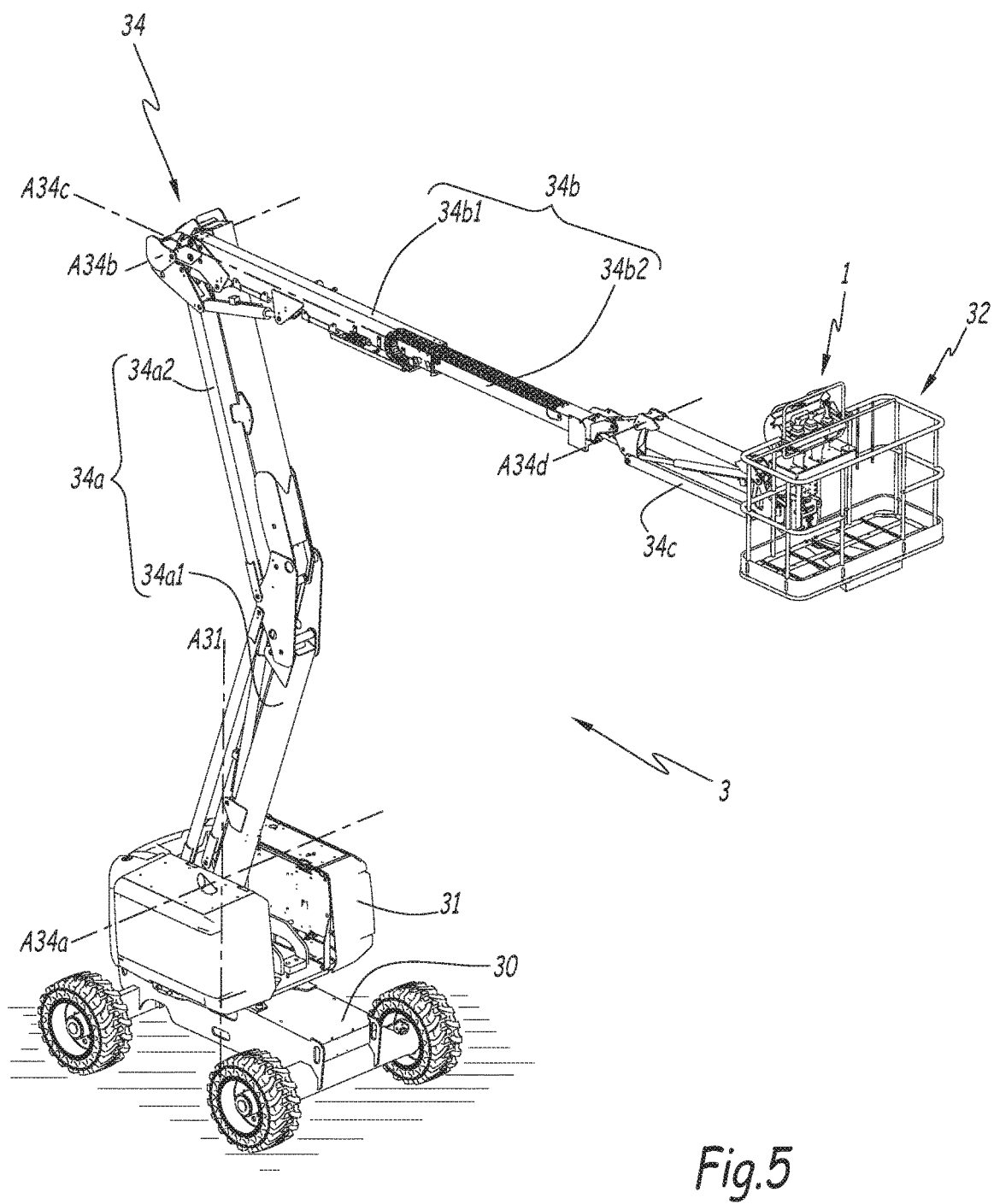
FIG. 5 is a perspective view of an aerial lift according to the invention, in a position corresponding to the configuration of the control console of FIG. 4.
Figure 7:
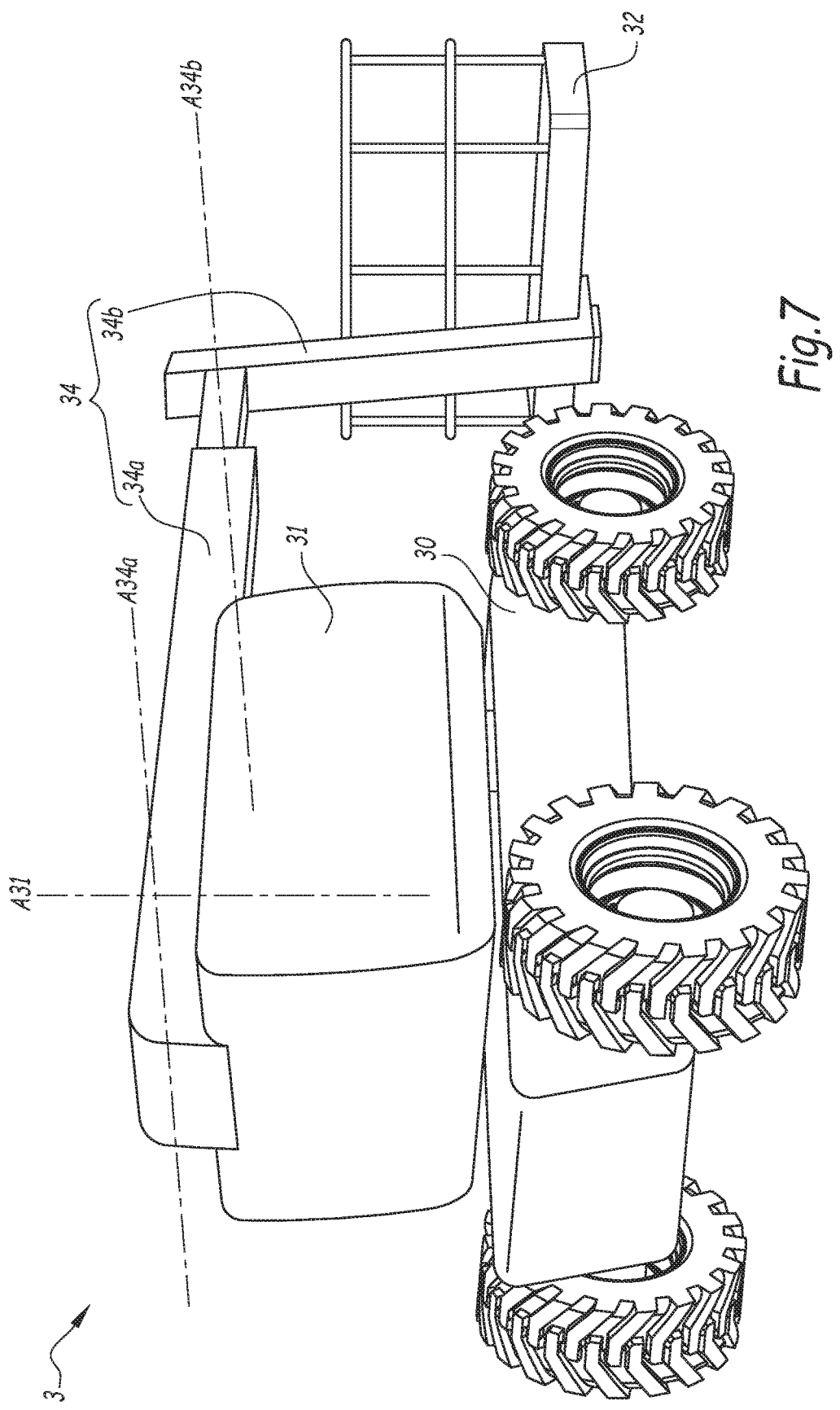
FIG. 7 is a perspective view of an aerial lift according to the invention, in a position corresponding to a loading configuration of the platform.

FIG. 1 shows a control console 1 for an aerial lift 3 shown in FIGS. 5 and 7. The control console 1 comprises a main panel 10 and three manual control members 13, 15 and 17. The control console 1 also comprises several control switches 19 distributed on the main panel 10, and suitable for controlling certain functionalities of the aerial lift 3. The embodiments of the manual control members 13, 15 and 17 and of the control switches 19 are known and will be described in a simplified manner to facilitate the understanding of the invention.

The aerial lift 3 comprises a chassis 30 provided with members for moving on the ground such as wheels or tracks, a platform 32 and a lift structure 34 of the platform 32 relative to the chassis 30.

The lift structure 34 comprises a deploying lower arm 34a, a telescoping upper arm 34b and a pendular arm 34c, which provides the connection between the upper arm 34b and the platform 32. The lower arm 34a comprises two sections 34a1 and 34a2 pivoting relative to one another and makes it possible to move the platform 32 in a vertical direction. The telescoping upper arm 34b is mounted with the possibility of pivoting relative to the lower arm 34a along an axis A34b. The upper arm 34b comprises two sections 34b1 and 34b2 sliding relative to one another along an axis A34c to vary the distance between the platform 32 and the axis A34b. The decrease in this distance is commonly described using the expression "withdrawal of the telescope", and the increase thereof is described by the expression "deployment of the telescope". The pendular arm 34c is mounted with the possibility of pivoting relative to the telescoping upper arm 34b along an axis A34d and allows a small-amplitude vertical adjustment of the position of the platform 32.

In an alternative that is not shown, the lower arm 34a may not comprise two pivoting sections, but telescoping sections.

The chassis 30 also comprises a tower 31, which supports the lift structure 34. The tower 31 is rotatable relative to the chassis 30 along an axis A31 perpendicular to the axes of the wheels of the chassis 30.

The lower arm 34a is also pivoting relative to the tower 31 along an axis A34a perpendicular to the rotation axis A31 of the tower 31.

The control member 13 makes it possible to control the withdrawal or deployment of the telescope of the telescoping upper arm 34b and the rotation of the tower 31. The control member 13 can be actuated in the front or rear, for the withdrawal or deployment of the telescope of the telescoping upper arm 34b, and on the left or right, to control the rotation of the tower 31 relative to the chassis 30.

The manual control member 15 respectively makes it possible to raise or lower the lower arm 34a, by actuating the control member 15 at the front or rear.

The manual control member 17 controls the movement on the ground of the chassis 30. The control member 17 can be actuated in the front or rear, respectively to control the forward or backward movement of the aerial lift 3.

Figure 4:
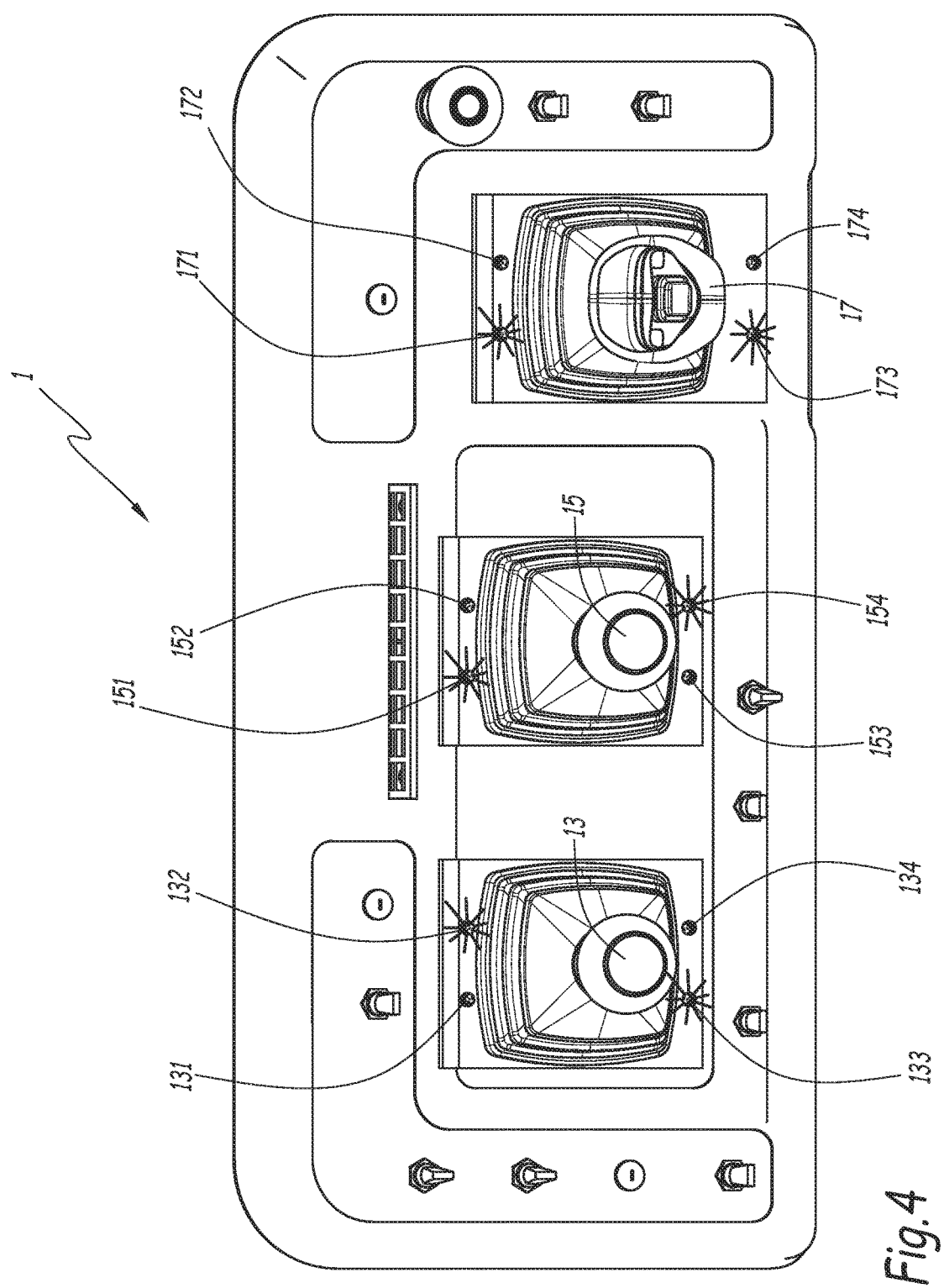
FIG. 4 is a top view of the control console of FIG. 1, in a first display configuration of visual indicators.
Figure 6:
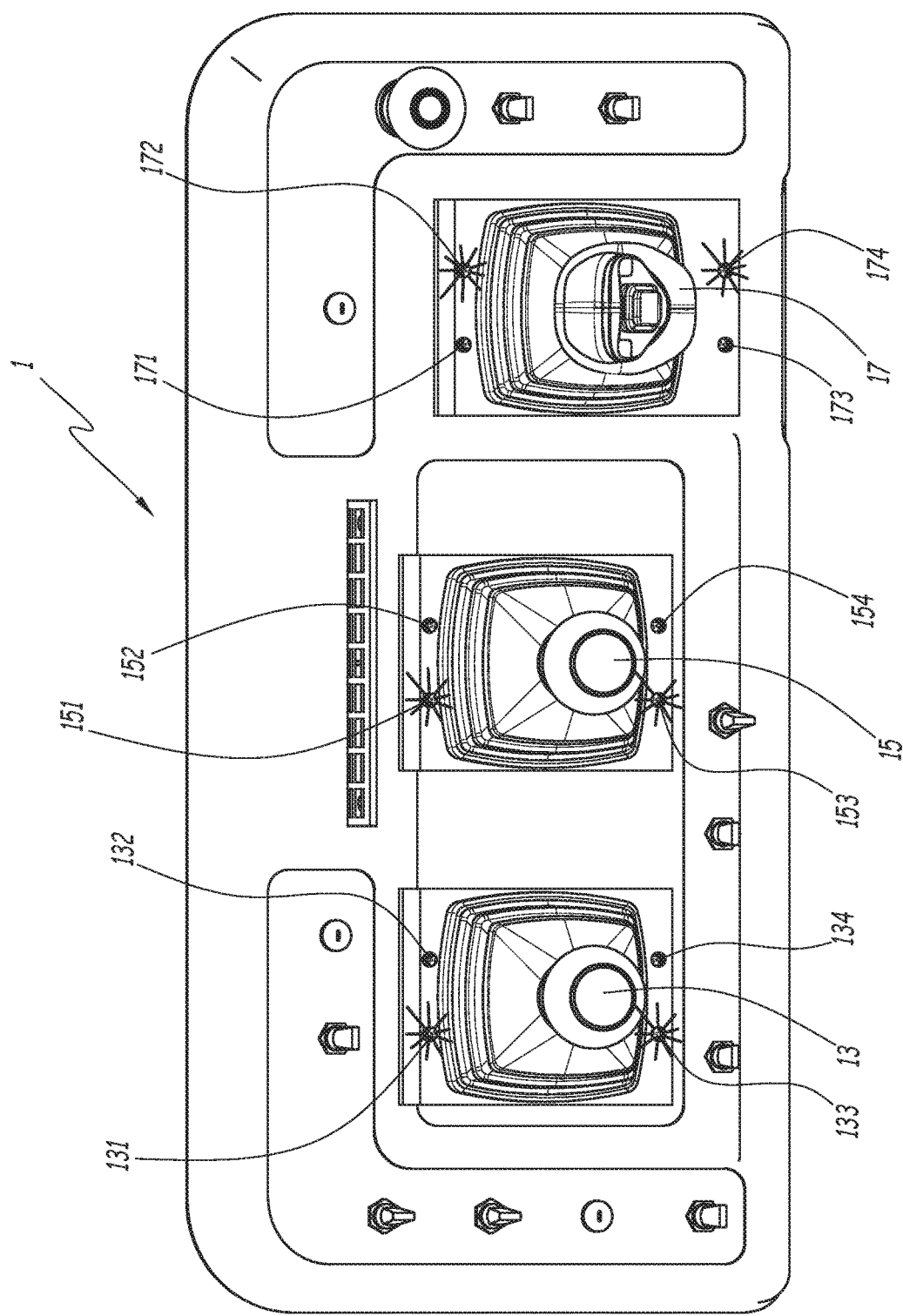
FIG. 6 is a view similar to FIG. 4, for a second display configuration of visual indicators.
Figure 8:
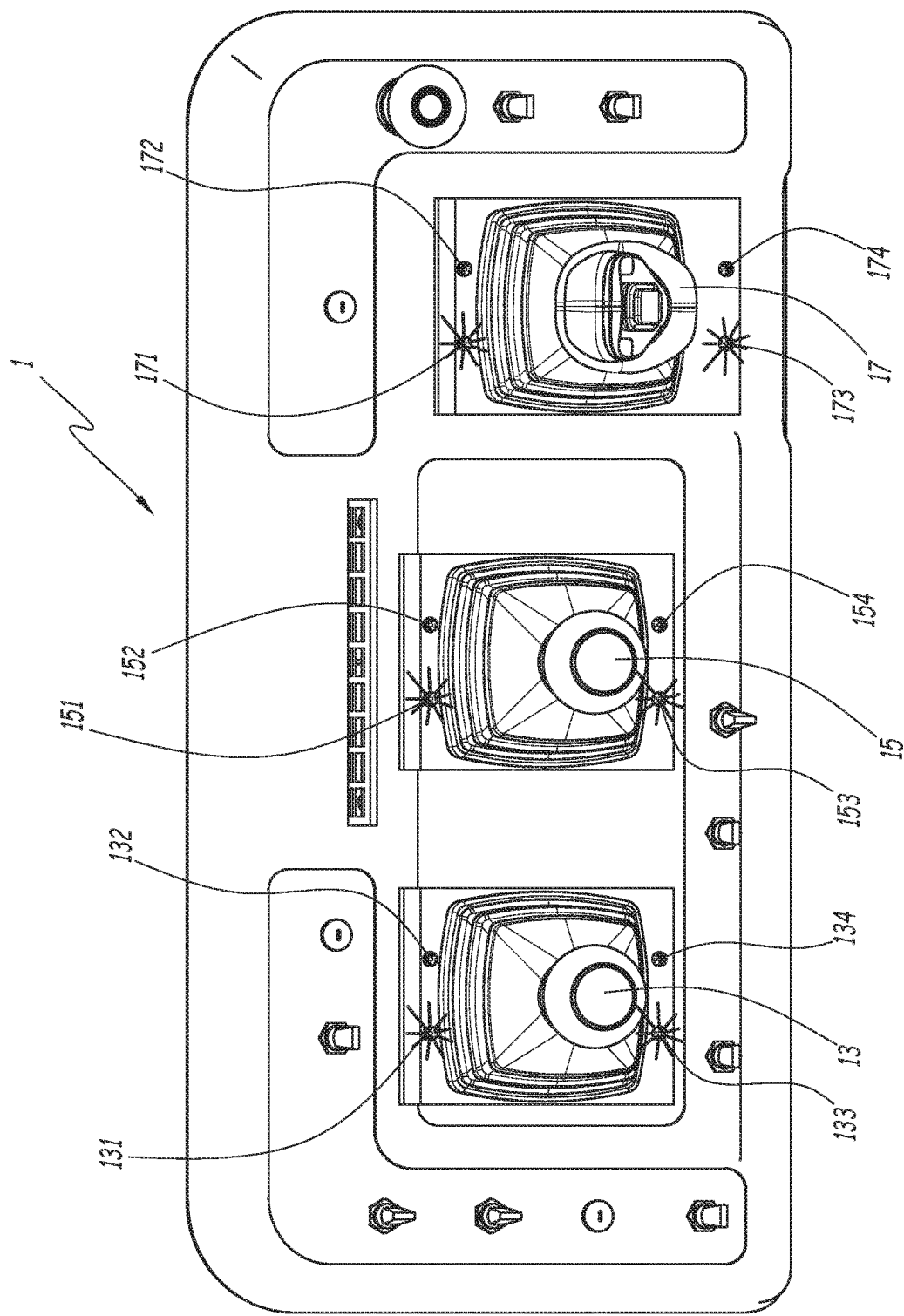
FIG. 8 is a view similar to FIGS. 4 and 6, for a third configuration of the control console.

The terms front and rear are used relative to a person located in front of the control console 1, front designating the direction in front of the person, rear being the direction behind the person. In FIGS. 4, 6 and 8, the front side is situated toward the top of the figure, while the rear side is situated toward the bottom of the figure. In the configuration of the lift 3 shown in FIG. 5, the front direction is oriented along the axis A34c toward the axis A34b.

In order to allow an operator controlling the aerial lift 3 to determine which movements can be performed, the control console 1 comprises at least one lighted indicator making it possible to signal, by a lighted signal emitted in the immediate environment of one of the manual control members 13, 15 and 17, whether the actuation of this manual control member is possible in light of the operating conditions of the aerial lift 3.

The term "movements" refers to all possible actions that can be done on the aerial lift 3, which includes movements of the chassis 30 on the ground, the vertical deployment of the sections 34a1 and 34a2 of the lower arm 34a, the rotation of the telescoping upper arm 34b around the axis A34b, the sliding of the sections 34b1 and 34b2 of the telescoping upper arm A34b along the axis A34c, the vertical movement of the pendular arm 34c, the rotation of the tower 31 around the axis A31.

"Immediate environment" means that the lighted indicator(s) are placed around and at a distance from the manual control member for which they indicate the movement possibilities so as to avoid confusion with another manual control member. Advantageously, the lighted indicator(s) corresponding to a manual control member are placed at a distance from this manual control smaller than the distance separating the lighted indicator(s) of two other manual control members. Still more advantageously, the lighted indicators are placed at a predefined maximum distance from the manual control members for which they indicate the possibility of actuation, for example 5 cm.

The operating conditions of the lift 3 correspond to the state of different parts of the aerial lift 3, in particular the position of the platform 32 relative to a predefined authorized movement envelope relative to the need to preserve the stability of the aerial lift 3 and safety standards, and the mechanical movement possibilities of the different parts of the lift structure 34. The operating conditions also include parameters measured by sensors, in particular, for example, the mass present on the platform 32 and the incline of the chassis 30, which are limited for safety reasons. The operating conditions also include the control members during use by the operator of the aerial lift 3. The mechanisms of the lower arm 34a and the telescoping upper arm 34b are equipped with position sensors, not shown. These position sensors can be of the "all or nothing" type or the proportional type, for example cable winders. These position sensors can in particular be integrated into the actuators of the lift 3, for example in a jack making it possible to deploy the lower arm 34a. Thus, the mechanical limitation resulting from the arrival at the end of travel of an actuator is taken into account in the operating conditions.

In the illustrated example, the control console 1 comprises, for each of the manual control members 13, 15 and 17, lighted indicators positioned relative to these manual control members in the directions in which these manual control members can be actuated.

More specifically, the control console 1 comprises four lighted indicators 131, 132, 133 and 134 positioned around the control member 13 in its immediate environment. The indicators 131 and 132 are provided on the front side of the control member 13, while the indicators 133 and 134 are provided on the rear side of the control member 13. The indicators 131 and 132 therefore make it possible to display the possibility of actuating the control member 13 in the forward direction. Preferably, the lighted indicator 131 emits light in a color indicating the impossibility of actuating the manual control member 13 in the forward direction, for example red, while the lighted indicator 132 emits light in a color indicating the possibility of actuating the manual control member 13 in the forward direction, for example green. The same is true for the indicators 133 and 134, which respectively display a red light and a green light, for actuating the manual control member 13 in the rear direction. The four lighted indicators 131, 132, 133 and 134 positioned around the control member 13 represent a first manual control member 13 and a first group of lighted indicators 131, 132, 133 and 134.

When the lighted indicator 131 emitting a red light lights up, this means that it is not possible to actuate the control member 13 in the forward direction, since the corresponding movement of the aerial lift 3, i.e., the withdrawal of the telescope from the upper telescoping arm 34b, cannot be done. Conversely, when the green signal of the indicator 132 lights up, this means that the control member 13 can be actuated in the forward direction, since the withdrawal of the telescope from the telescoping upper arm 34b is possible.

The same is true for the red and green respective signals emitted by the indicators 133 and 134 for actuating the control member 13 in the rear direction, corresponding to the deployment of the telescope from the upper telescoping arm 34b.

In the illustrated example, the possibility of actuating the manual control member 13 on the left or right is not indicated by lighted indicators. In an alternative that is not shown, it is possible to provide, on the control console 1, in the immediate environment of the manual control member 13, lighted indicators indicating the possibility of actuating the manual control member 13 on the left or right.

The manual control members 15 and 17 also each comprise a group of four respective lighted indicators 151, 152, 153, 154 and 171, 172, 173, 174. The actuations of the control members 15 and 17 toward the front and rear are indicated in red or green based on their possibility of being done, similarly to what is described in reference to the manual control member 13. The four lighted indicators 151, 152, 153, 154 positioned around the control member 15 represent a second manual control member 15 and a second group of lighted indicators 151, 152, 153, 154. The four lighted indicators 171, 172, 173, 174 positioned around the control member 17 represent a third manual control member 17 and a third group of lighted indicators 171, 172, 173, 174.

The lighted indicators are preferably formed by light-emitting diodes (LEDs). The lighted indicators are all electrically connected to one or several electronic control units of the aerial lift 3, suitable for centralizing the control algorithms of the aerial lift 3, the information regarding the operating conditions, in particular the information received in the form of signals emitted by the position sensors of the lower arm 34a and the upper arm 34b, and emitting the electrical signals intended for the lighted indicators making it possible to display lighted signals indicating the movement possibilities determined by the control algorithms.

Figure 2:
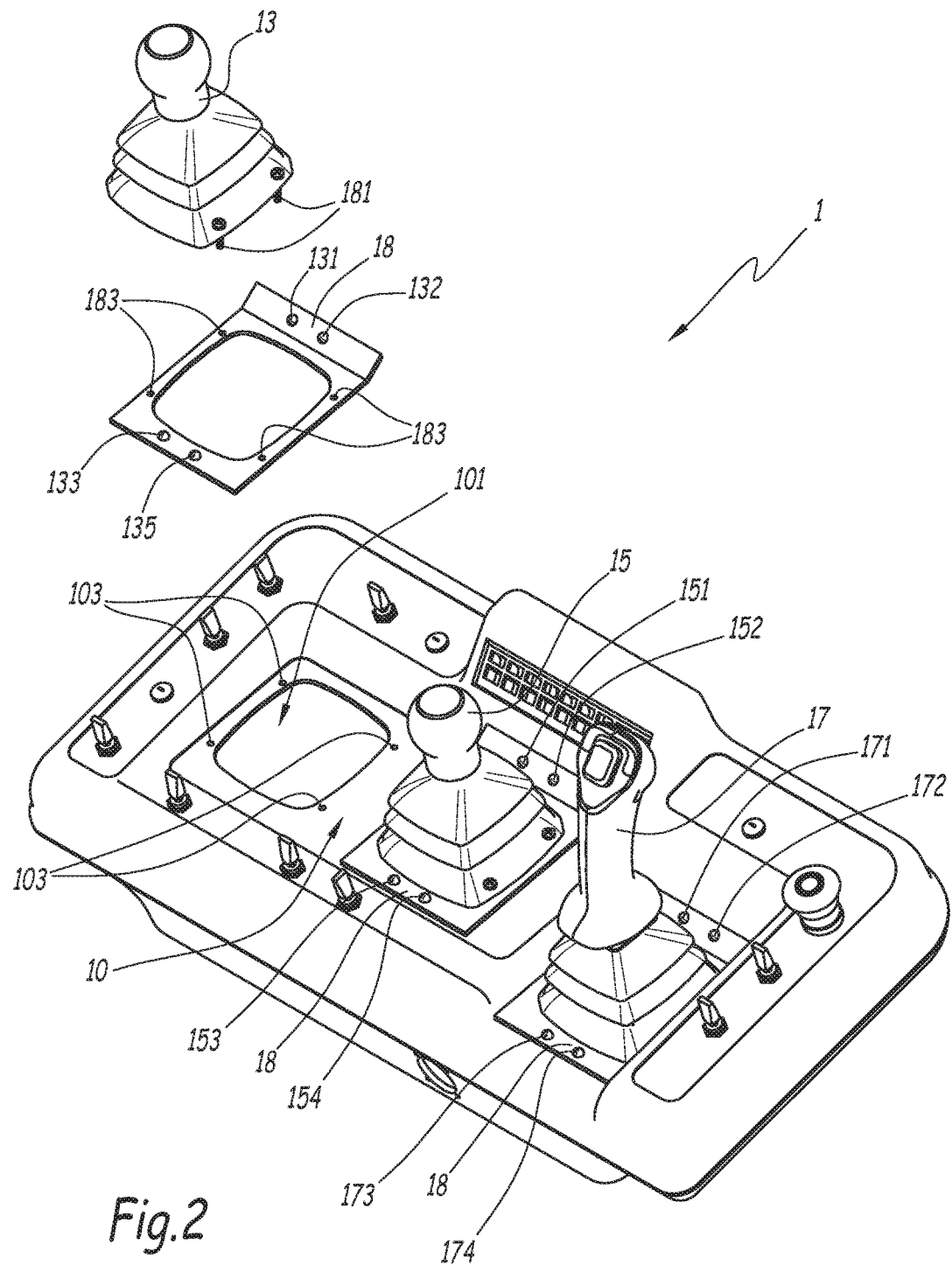
FIG. 2 is an exploded perspective view of the mounting of a manual control member on the control console of FIG. 1.

As shown in FIG. 2, the lighted indicators can be provided on bases 18 fastened between the main panel 10 and the manual control members 13, 15 and 18. The main panel 10 comprises three openings, one of which is visible and bears reference 101, in which the manual control members 13, 15 and 17 are mounted. The bases 18 are fastened on the edges of the openings 101, and the manual control members 13, 15 and 17 are in turn fastened on the bases 18, for example using screws 181 inserted in holes 183 of the bases 18, then in holes 103 of the main panel 10. The bases 18 can be made up of a rigid printed circuit that incorporates the lighted indicators and is covered by a membrane made from a protective and sealed material, such as polycarbonate. This makes it possible to simplify the integration of the lighted indicators into the control console 1, while avoiding piercing of the rigid main panel 10 for each lighted indicator.

According to another embodiment of the invention that is not shown, a single base 18 can cover the entire surface of the main panel 10. The base 18 may also include some of the switches 19 formed for example by flexible parts of the membrane keyboard type.

According to one embodiment of the invention that is not shown, at least one of the lighted indicators is fastened directly on the main panel 10. In this case, the main panel 10, which is formed by a rigid material plate, is pierced with one or several orifices in which the lighted indicators are mounted and electrically connected.

Figure 3:
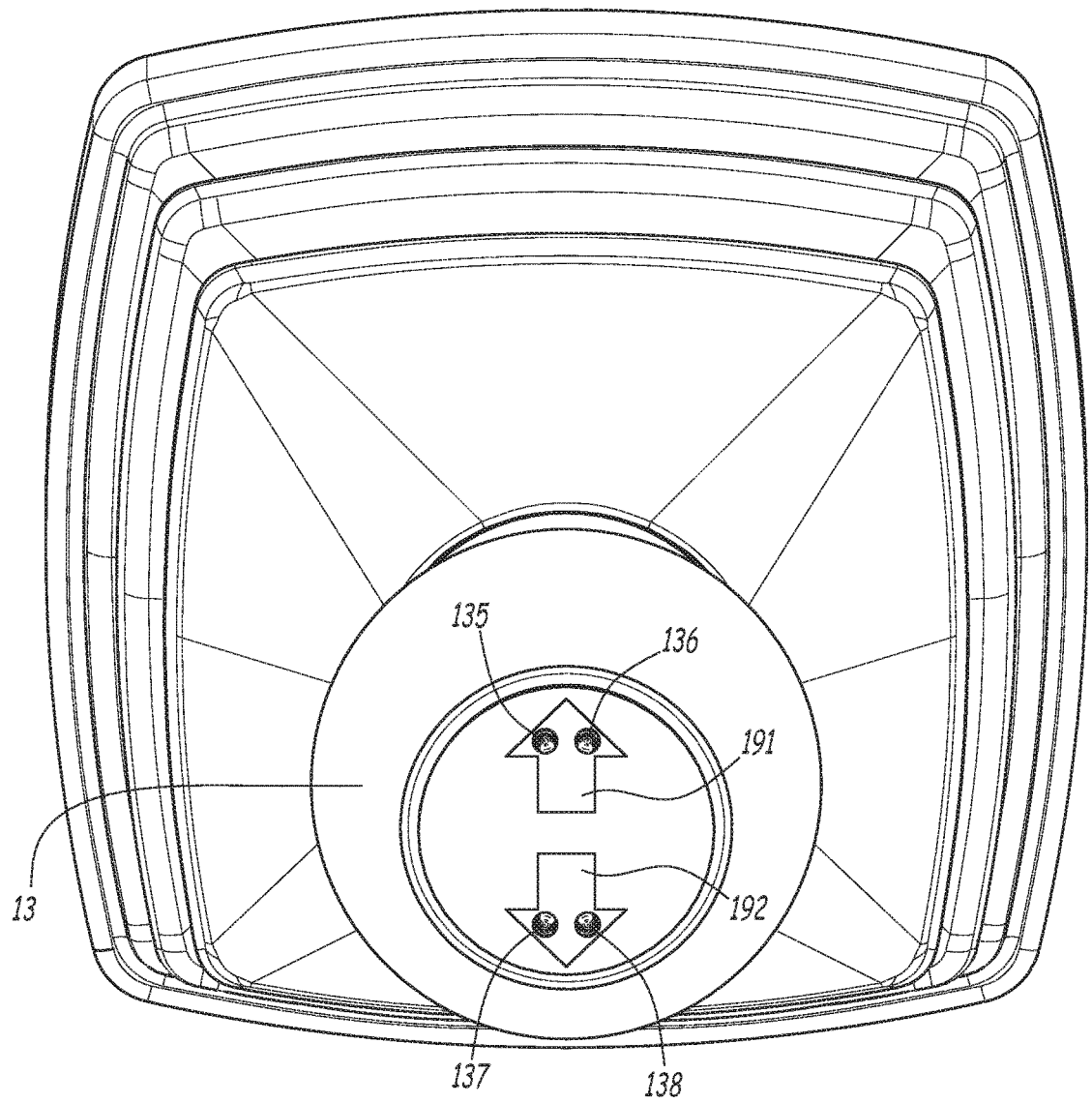
FIG. 3 is a top view of a manual control member showing one embodiment of visual indicators.

According to one alternative embodiment shown in FIG. 3, at least one of the lighted indicators can be fastened directly on the manual control member corresponding to this lighted indicator. Lighted indicators 135, 136, 137 and 138 are fastened on the manual control 13 and respectively replace the lighted indicators 131, 132, 133 and 134.

As shown in FIG. 3 by the lighted indicators 135, 136, 137 and 138, and as can be applied to the other embodiments, the lighted indicators are preferably topped by diffusers suitable for widening their light-emitting surface and improving their visibility under low lighting conditions. Such diffusers may for example comprise a translucent part made from plastic, in which one or several light indicators are received. The shape of the diffuser can represent a symbol, for example an arrow. In FIG. 3, two diffusers 191 and 192 in arrow form are provided on the control member 13. The diffuser 191 is oriented in the forward direction and encompasses the lighted indicators 135 and 136, while the diffuser 192 is oriented toward the rear and encompasses the lighted indicators 137 and 138. Thus, each of the diffusers 191 and 192 alternately lights up in red or green. The diffusers can for example be made in a single-piece manner with the bases 18.

The lighted indicators are suitable for emitting one or several types of light signals. The red signal indicators, like the indicators 131, 133, 151, 153, 171 and 173, are suitable for emitting a steady red light signal if it is impossible to perform a movement. Alternatively, this red light signal is emitted only if a manual control member is actuated while the corresponding movement is impossible, in order to avoid polluting the operator's view with too many light signals.

The green lighted indicators, like the indicators 132, 134, 152, 154, 172 and 174, are suitable for emitting a green blinking during the actuation of a manual control corresponding to a performable movement.

Operating examples of the invention are shown in FIGS. 4 to 9. In FIGS. 4 and 5, the aerial lift 3 is in a configuration in which, on the one hand, the sections 34a1 and 34a2 of the arm 34a are fully deployed and oriented upward, and on the other hand, the sections 34b1 and 34b2 of the telescoping upper arm 34b are in a position where an additional deployment movement of the telescope risks in balancing and tilting the aerial lift 3.

In this configuration, the lower arm 34a reaches a mechanical limit of its movement envelope that is detected by a position sensor, not shown. The upward tilting of the lower arm 34a around the axis A34a is not possible. The lighted indicator 151 of the control member 15 is illuminated and emits a red light, indicating that the actuation of the control member 15 in the forward direction has no effect. The downward tilting of the lower arm 34a, however, still remains possible, which is indicated by the indicator 154, which emits a green signal.

In such a configuration, lighted signals attest that an actuator of the lift 3 used to perform movements commanded by the manual control members 13, 15 or 17 is or is not at the end of travel.

In this same configuration, the deployment of the telescope of the telescoping upper arm 34b along the axis A34c is not allowed by the electronic control units. The lighted indicator 133 of the control member 13 is illuminated and emits a red light, indicating that the actuation of the control member 13 in the rear direction has no effect. The withdrawal of the telescoping upper arm 34b, however, still remains possible, which is indicated by the indicator 132, which emits a green signal.

Certain normative requirements, in particular in the European Union, prohibit simultaneously moving the lift structure 34 and moving the chassis 30 on the ground. FIG. 6 shows a situation where the manual control member 17 for rolling of the chassis 30 is being actuated. The manual control members 13 and 15 of the lift structure 34 are made inoperative, which is indicated by the illumination of the red lighted indicators 131, 133, 151 and 153. In the reverse situation—not shown—where one of the manual control members 13 and 15 of the lift structure is being actuated, the manual control member 17 for rolling of the chassis 30 is made inoperative, which is indicated by the illumination of the lighted indicators 171 and 173, which emits a red light.

In the configuration of FIGS. 7 and 8, the platform 32 is close to the ground, allowing one or several people to be placed on the platform 32. The use of the aerial lift 3 is limited to a predetermined weight on the platform 32. If the mass of the people or materials carried on the platform 32 exceeds a threshold value, the manual control members 13, 15 and 17 become inoperative, and the lighted indicators 131, 133, 151, 153, 171 and 173 are lit to display a red light indicating the impossibility of movement due to the excess of the authorized mass.

Figure 9:
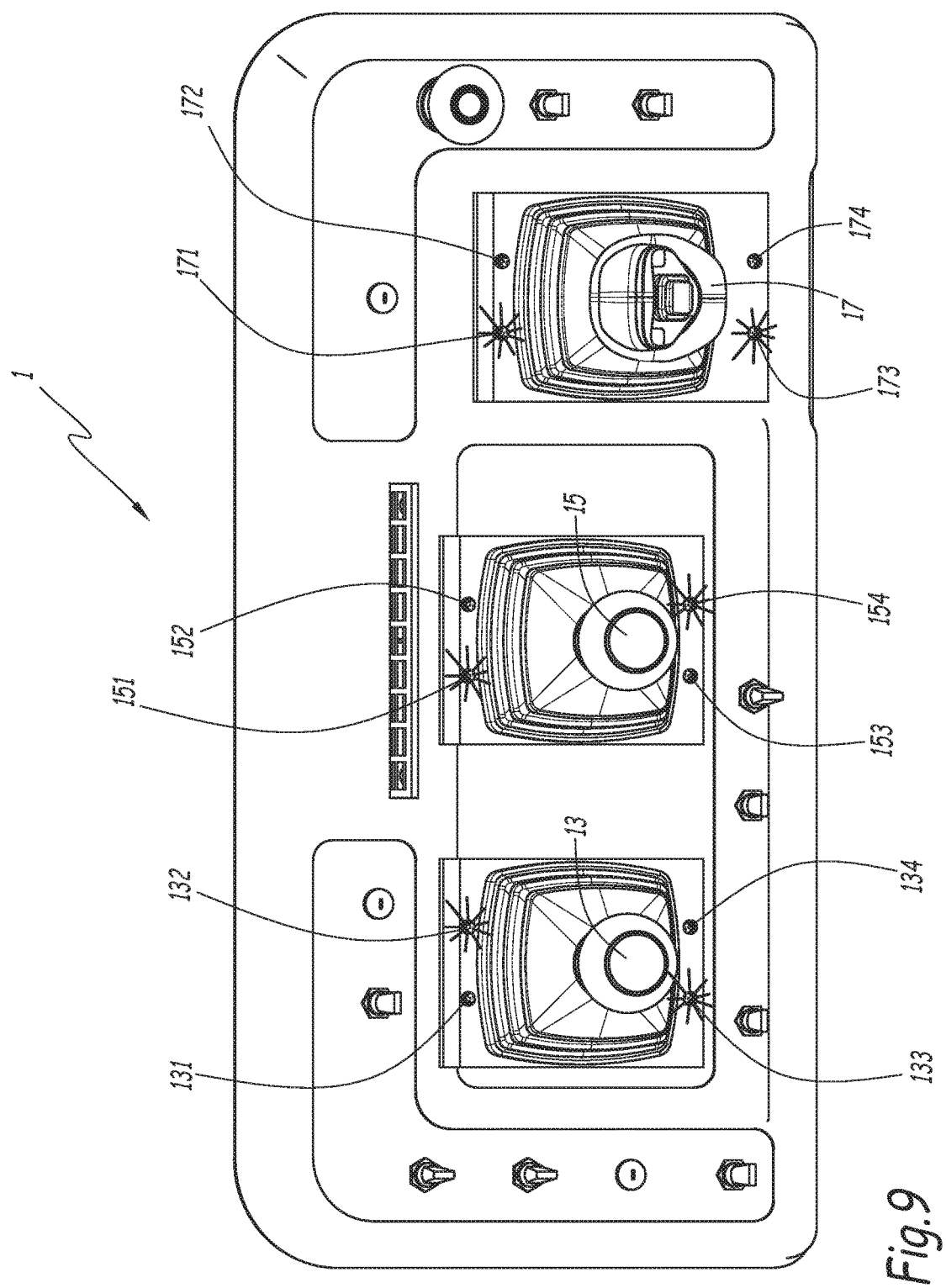
FIG. 9 is a view similar to FIGS. 4, 6 and 8, for a fourth configuration of the control console.

In a configuration illustrated by the control console shown in FIG. 9, the incline of the chassis 30 exceeds the maximum authorized value. In this situation, the electronic control units prohibit all movements that increase the risk of tilting of the machine. The actuation of the manual control member 17 for rolling of the chassis 30 is made inoperative in both directions, which is indicated by the illumination of the lighted indicators 171 and 173, which emits a red light. The deployment of the telescope of the telescoping upper arm 34b along the axis A34c and the upward tilting of the lower arm 34a around the axis A34a are not allowed, which is indicated by the illumination of the lighted indicators 133 and 151, which emits a red light. The withdrawal of the telescope of the telescoping upper arm 34b and the downward tilting of the lower arm 34a around the axis A34a, however, still remain possible, which is indicated by the indicators 132 and 154, which emit a green signal.

According to another optional aspect, the light intensity of the lighted indicators can be modified. The light intensity can be adjusted manually by an operator, or adjusted automatically based on the brightness of the ambient light.

Other configurations, not shown, of movement limitations of the different parts of the aerial lift 3 can also be indicated by the lighted indicators associated with the manual control members 13, 15 and 17, based on the different deployment possibilities of the lift structure 34. Furthermore, other manual control members, not shown, making it possible to control other functionalities of the aerial lift 3, can be associated with lighted indicators in order to indicate their actuation possibility.

In general, the signaling by the lighted indicators of possible movements makes it possible to facilitate the handling of the aerial lift 3 by unqualified personnel, who have the possibility of determining which manual control members of the control console 1 can be actuated to perform a given movement or action. This also makes it possible to avoid situations where the platform 32 is blocked in a position, and help the operator return to the ground. Furthermore, the lighted indicators allow learning through practice of the operation of the aerial lift for personnel with no prior training, which allows them to understand the possibilities and limitations of the aerial lift and to anticipate them.

According to one embodiment that is not shown, the lighted indicators can comprise more than four indicators for each manual control member, based on the number of possible actuating directions of the manual control members.

According to another embodiment that is not shown, each manual control member can be associated with a single lighted indicator for each actuating direction, suitable for lighting up with two different colors. The signal emitted by the lighted indicators can also have colors different from red and green.

According to another embodiment that is not shown, each manual control member of the control console 1 can be associated with a single lighted, suitable for indicating whether this manual indicator is usable, for example by displaying two lighted signals with different colors.

The features of the embodiments and alternatives described above may be combined to form new embodiments of the invention.

Furthermore, the invention is not limited to an aerial lift with an articulated arm. It is also applicable to all types of aerial lifts for personnel, in particular lift structures of the type with a telescoping arm, scissor and vertical mast and lifts mounted on a truck chassis or a trailer chassis.

The invention claimed is:

1. A control console for an aerial lift including a chassis, a platform, and a lift structure connecting the chassis to the platform, the control console comprising:

manual control members for controlling the aerial lift, wherein each of the manual control members can be actuated in at least two actuating directions when the aerial lift is in a suitable operating condition for movement in at least two movement directions corresponding to the at least two actuating directions; and for at least one of the manual control members, lighted indicators are provided on or around the at least one manual control member, the lighted indicators emitting color lighted signals indicating when the at least one manual control member is actuatable in a possible actuating direction to perform movement of the aerial lift in the movement direction corresponding to the possible actuating direction, as a function of a current operating condition of the aerial lift being able to move in the movement direction corresponding to the possible actuating direction, wherein a first one of the lighted indicators emitting the color lighted signals indicates when the at least one manual control member is actuatable in a first of the two actuating directions to perform a first movement of the aerial lift commanded by actuation of the at least one manual control member in the first of the two actuating directions, wherein, when the first one of the lighted indicators does not emit the color lighted signals, this indicates that the at least one manual control member is not actuatable in the first actuating direction to perform the first movement of the aerial lift in the first movement direction as the aerial lift is not able to move in the first movement direction based on the current operating condition of the aerial lift, wherein a second one of the lighted indicators emitting the color lighted signals indicates when the at least one manual control member is actuatable in a second of the two actuating directions to perform a second movement of the aerial lift commanded by actuation of the at least one manual control member in the second of the two actuating directions, and wherein, when the second one of the lighted indicators does not emit the color lighted signals it indicates that the at least one manual control member is not actuatable in the second actuating direction to perform the second movement of the aerial lift in the second movement direction as the aerial lift is not able to move in the second movement direction based the current operating condition of the aerial lift.

2. The control console according to claim 1, wherein each lighted indicator is positioned relative to the at least one manual control member in a direction corresponding to an actuating direction of the at least one manual control member.

3. The control console according to claim 1, wherein, a first one of the manual control members is provided with a first group of the lighted indicators, the first group of the lighted indicators being placed at a first distance from the first one of the manual control members, a second one of the manual control members is provided with a second group of the lighted indicators, the first group of the lighted indicators being placed a second distance from the second group of the lighted indicators, the first distance being smaller than the second distance.

4. The control console according to claim 1, wherein at least one of the lighted indicators is fastened directly on a main panel of the control console.

5. The control console according to claim 1, wherein at least one of the lighted indicators is provided on a base fastened on a main panel of the control console.

6. The control console according to claim 5, wherein the base is formed by a rigid printed circuit covered by a sealed membrane, and at least one of the lighted indicators is integrated into the rigid printed circuit.

7. The control console according to claim 1, wherein at least one of the lighted indicators is fastened directly on the at least one manual control member.

8. The control console according to claim 1, wherein the lighted indicators are topped by a diffuser suitable for widening a light emission surface of the lighted indicators.

9. The control console according to claim 8, wherein each diffusers is suitable for forming a lighted surface with a predefined shape.

10. The control console according to claim 1, wherein the lighted indicators are suitable for emitting one or several light signals from among:

a steady red light signal when the at least one manual control member is not actuatable in the possible actuating direction to perform movement of the aerial lift in the movement direction corresponding to the possible actuating direction;

a red light signal emitted only when the at least one manual control member is actuated while movement of the aerial lift in a direction corresponding to the lighted indicator emitting the red light signal is impossible; and a blinking green light during the actuation of the at least one manual control member corresponding to movement of the aerial lift in a direction corresponding to the lighted indicator emitting the blinking green light.

11. The control console according to claim 1, wherein the aerial lift includes an actuator that is configured to perform movement commanded by the at least one manual control member, the actuator having an end of travel, and wherein at least one of the lighted indicators is suitable for displaying a lighted signal attesting that the actuator of the aerial lift, used to perform the movement commanded by the at least one manual control member, is or is not at the end of travel.

12. The control console according to claim 1, wherein the operating conditions of the aerial lift include at least one of:

a position of the platform relative to an authorized movement envelope;

a mass carried on the platform;

an incline angle of the chassis; and rolling of the chassis on the ground or the movement of the lift structure.

13. An aerial lift comprising a control console according to claim 1.

14. The control console according to claim 1, wherein, each lighted indicator is positioned relative to the at least one manual control member in a direction corresponding to an actuating direction of the at least one manual control member, the first of the two actuating directions is a forward direction, the second of the two actuating directions is a rear direction, the first one of the lighted indicators is positioned forward of the at least one manual control member on a front side of the at least one manual control member, and the second one of the lighted indicators is positioned rearward of the at least one manual control member on a rear side of the at least one manual control member.

\* \* \* \* \*